May 17, 1927.

R. S. SMITH 1,628,751

APPARATUS FOR FORMING METAL ELEMENTS

Filed Nov. 15, 1921   4 Sheets-Sheet 1

Inventor
R. Stanley Smith
By Erwin, Wheeler & Woolard
Attorney

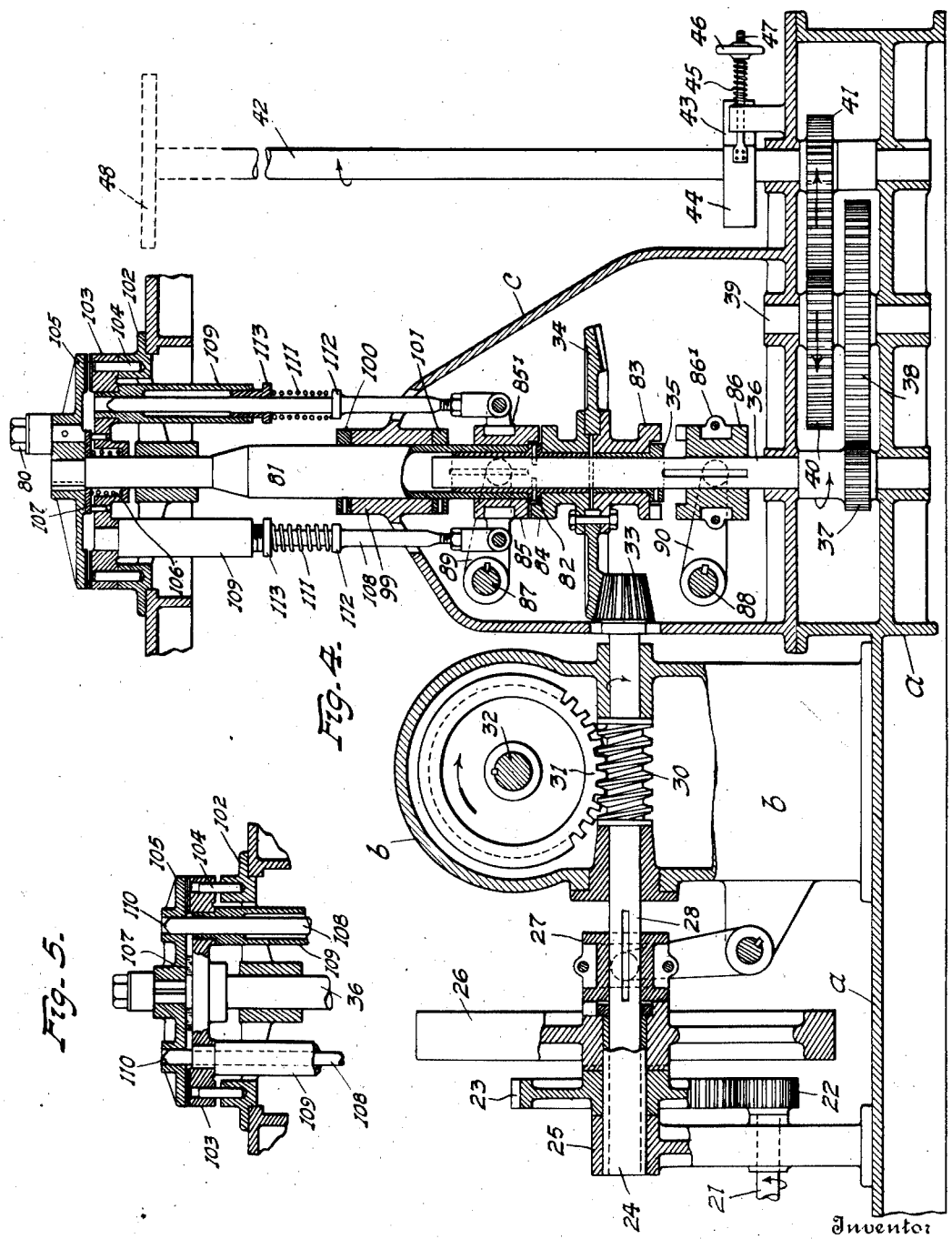

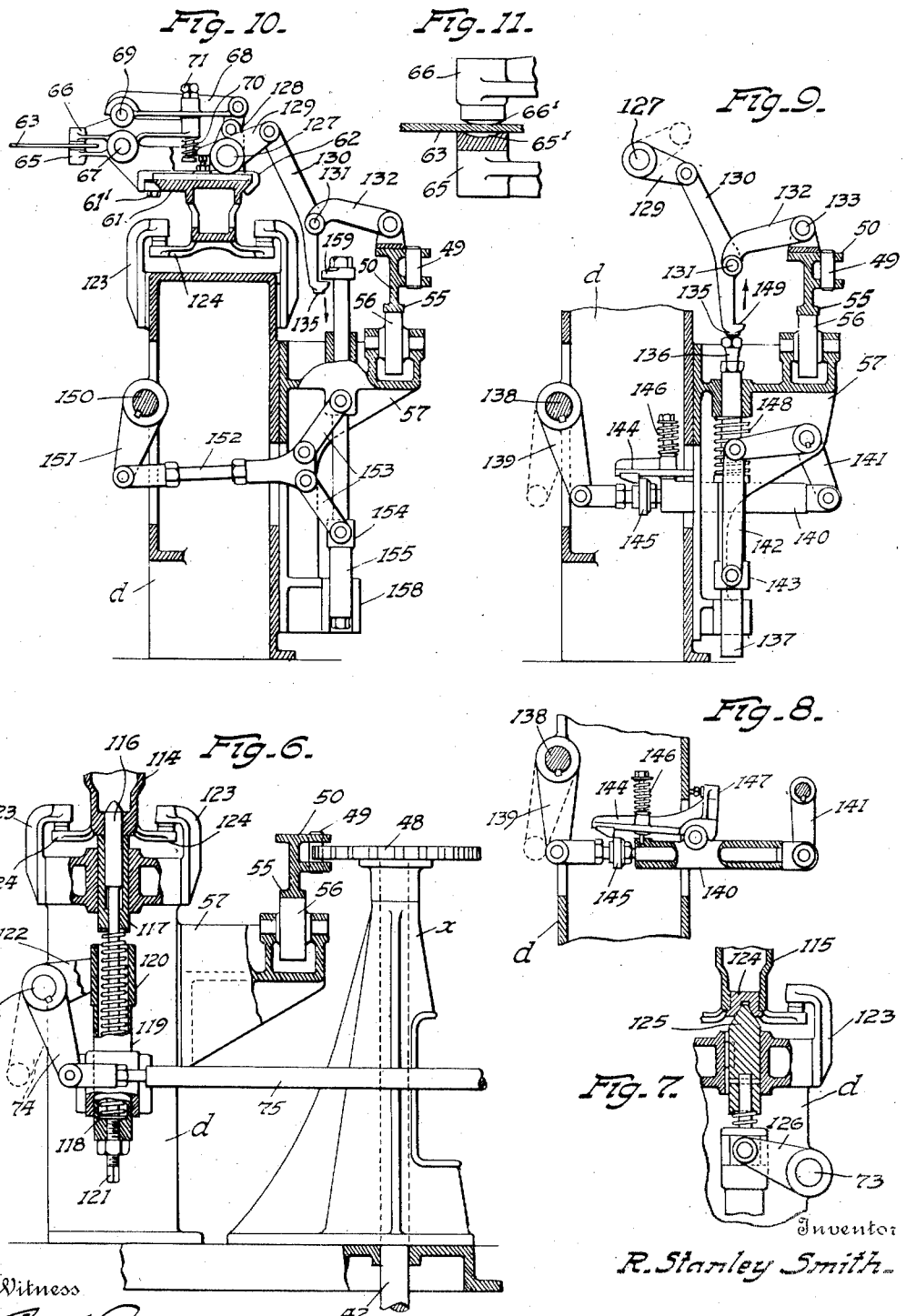

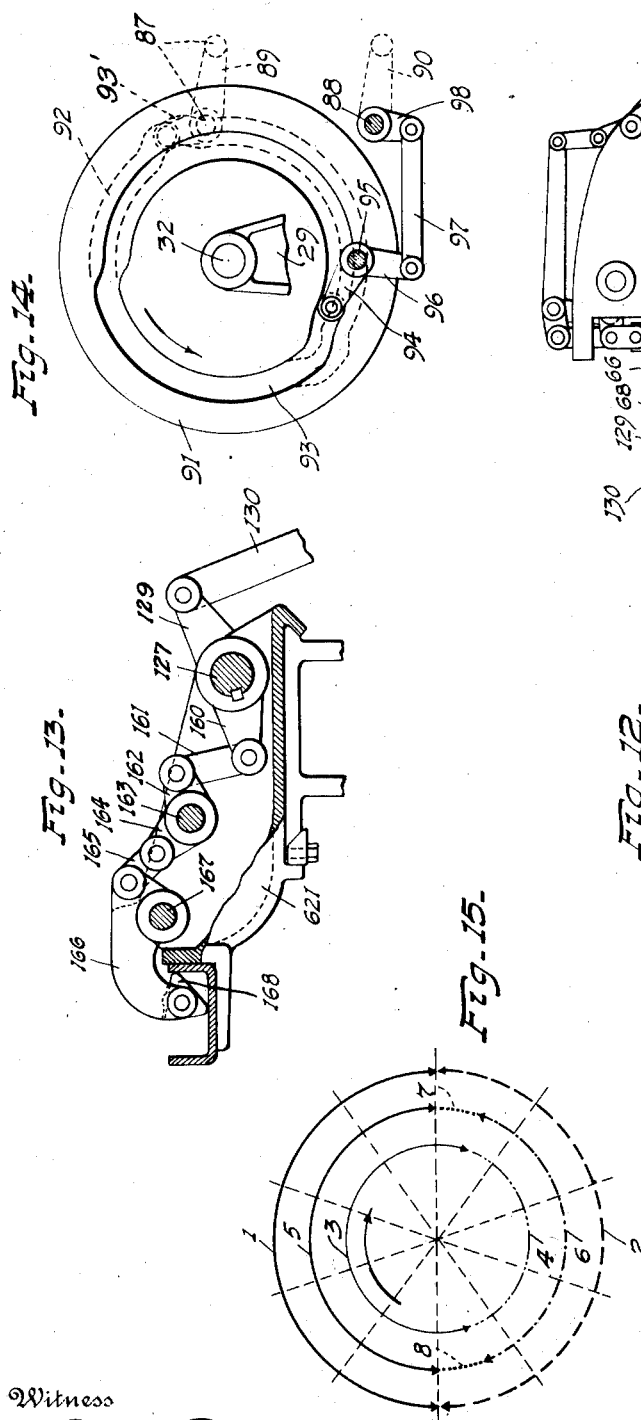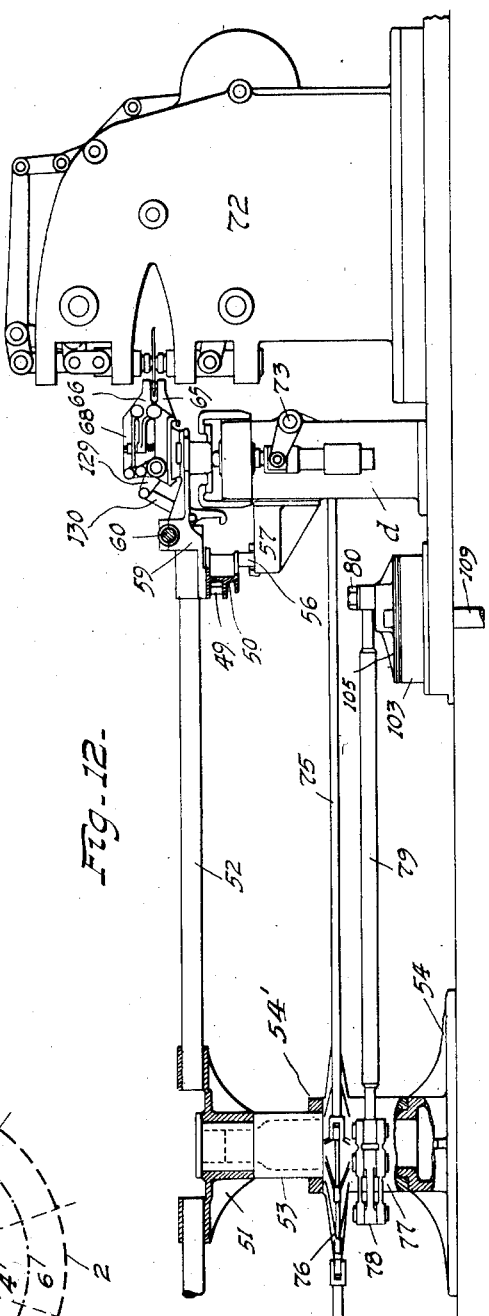

Patented May 17, 1927.

1,628,751

UNITED STATES PATENT OFFICE.

REUBEN STANLEY SMITH, OF MILWAUKEE, WISCONSIN, ASSIGNOR TO A. O. SMITH CORPORATION, OF MILWAUKEE, WISCONSIN, A CORPORATION OF NEW YORK.

APPARATUS FOR FORMING METAL ELEMENTS.

Application filed November 15, 1921. Serial No. 515,377.

In an application filed by me on January 21, 1918, Serial No. 212,934, on which Patent No. 1,397,020, was granted November 15, 1921, I have disclosed an apparatus designed specifically for the automatic production of automobile or other vehicle frames, but which apparatus is capable of other uses in which production of elements and their assembly and fabrication into completed articles is involved. Such apparatus comprises an assemblage of machines which, by their related and successive operations, punch from metal plates or sheets the side and cross bar blanks and other blanks used in constructing an automobile or other vehicle frame, shape such blanks according to the particular requirements pertaining to each, perform in succession the necessary milling operations thereon, assemble the several constituent parts, and secure all of the parts in their respective positions by means of rivets, so that in a continuous operation of the devices comprised in the assemblage a completed automobile or other vehicle frame, or other article, is progressively and automatically produced.

In practice, the assemblage referred to is operated in cycles of time, which are subdivided into alternate periods of work and periods of rest. During the periods in which the work is being performed, the several machines of the assemblage operate in substantial synchronism. During the periods of rest, the several conveyor mechanisms act to transfer the materials being operated upon from department to department, or from machine to machine at such departments as require more than one machine for the completion of the duties to be performed thereat. The assemblage as an entirety is operated upon a schedule which contemplates the automatic production of completed automobile frames in a definite ratio of a given number of frames per minute.

The present invention relates to the construction of one of the mechanisms designed for use in the said assembly, namely, the cross bar turret, to which the cross-bar blanks in the various stages of their completion are adapted to be diverted for the time being from the straight line of their travel, so that such blanks may be subjected to treatment by the several machines and tools which are associated with the revolving turret.

The utilization of revolving turrets with which are associated the mechanisms for successively and progressively acting upon the cross bar blanks carried by the turret and presented thereto in regular periods of time, enables me to secure a more compact arrangement of the machines constituting the general assembly, and to greatly economize in the matter of linear floor space, such as would be required were the turret not employed and the mechanisms now associated therewith arranged along the straight line of travel of the blanks in converting them from mere blanks to finished articles.

Some of the operations which are performed upon the cross bar blanks in their passage through the general assembly, take place in such proximity to each other that it is not possible to position the several operating machines and tools in such relation to the blanks that all of the necessary operations can be performed simultaneously. This condition of affairs necessitates the setting of the several machines and tools in such positions that the cross bar blanks may be successively presented thereto in succeeding periods of time for the correct performance of such operations. I have found the revolving turret with its associated machines concentrically positioned with relation thereto, to be the embodiment of the best arrangement of the devices for the achievement of the purpose desired.

As hereinbefore indicated, it is desirable all of the machines in the general assembly shall operate in substantial synchronism, and the revolving turret therefore be operated to accurately present the cross bar blanks carried by it to the machines and tools in the fraction of the cycle of time allowed for the operation of the conveyor mechanisms of the general assembly. But it is obvious that the intermitting operations of the turret need not be in exact synchronism with the other machines of the general assembly. This latitude in the operation of the turret is due to its capability of independent operation, and it is only to be required that the delivery of the blanks to the turret, and the return thereto to their main line of travel at the conclusion of the operations to be performed thereon, be coincident with the timed movements of the conveyor mechanism which supplies the cross bar blanks to the turret and receives such blanks after the machines and tools associated with the turret have performed their predetermined operations.

The cross bar blanks being comparatively short in length, are well adapted to easy manipulation by the revolving turrets. The turrets are provided with means for clamping the cross bar blanks delivered to them in succession from the line conveyor, so that such blanks are properly held for positioning in correct relation to the machines and tools arranged about the revolving turret. The movement of the turret is intermitting, so that the blanks supported in the clamping devices thereon are presented to the successive machines associated with the turret, with a dwell or pause in front of each machine for a portion of the time cycle sufficient to permit the desired operations to be performed upon the blank. Upon the performance of the operations by one machine, the blank is moved in the step-by-step rotation of the turret to present it to the next machine, and so on, until each blank has been treated, in the advancement of the succession of blanks.

The machines and tools associated with the turret will be of a character to perform the several operations desirable in converting the blanks into a complete cross bar, provided with the necessary gussets and hangers, and ready for attachment in position as a connecting member of the automobile frames.

After being subjected to a succession of operations by means of which the cross bar blank is perforated for the accommodation of the rivets used in securing the cross bar in position as an element of the automobile frames, the blank will be passed to a drawing press which will turn the side margins thereof, so as to form a channel bar having the web thereof reinforced by angularly extending flanges. After shaping the channel cross bar, another machine will fold the projecting ends thereof so as to form laps and ears by means of which the cross bar may be connected to the side bars of the automobile frames. In its progress through the assembly the channel cross bar will be supplied with the necessary gussets and hangers, which will be attached thereto upon presentation of the cross bar to machines and tools designed to achieve the desired result.

Upon the completion of the operations involved in the production of the cross bars, the latter will be delivered to the straight line conveyor for transfer to the assembling department, where they will be incorporated as elements of the automobile frame, all as disclosed in the patent hereinbefore referred to.

The novel features of the invention will be pointed out in the appended claims.

In the drawings hereto attached,

Figure 1 is a general plan view of a turret constructed in accordance with my invention, parts being broken out to save space, but showing the receiving station and the delivery station, as well as the partial grouping about the turret of some of the special machines and tools associated therewith, and which perform the several operations upon the cross-bar blanks in the revolving movements of the turret.

Fig. 4 is an enlarged vertical sectional view, looking in the direction of the arrow 4, Fig. 1, and showing details of construction of the parts actuated by the driving motor, and from which the movable elements of the turret receive their impulses.

Fig. 5 is a similar view showing some of the elements cooperating with the crank mechanism at the top of Fig. 4, as in locking position.

Figure 1:
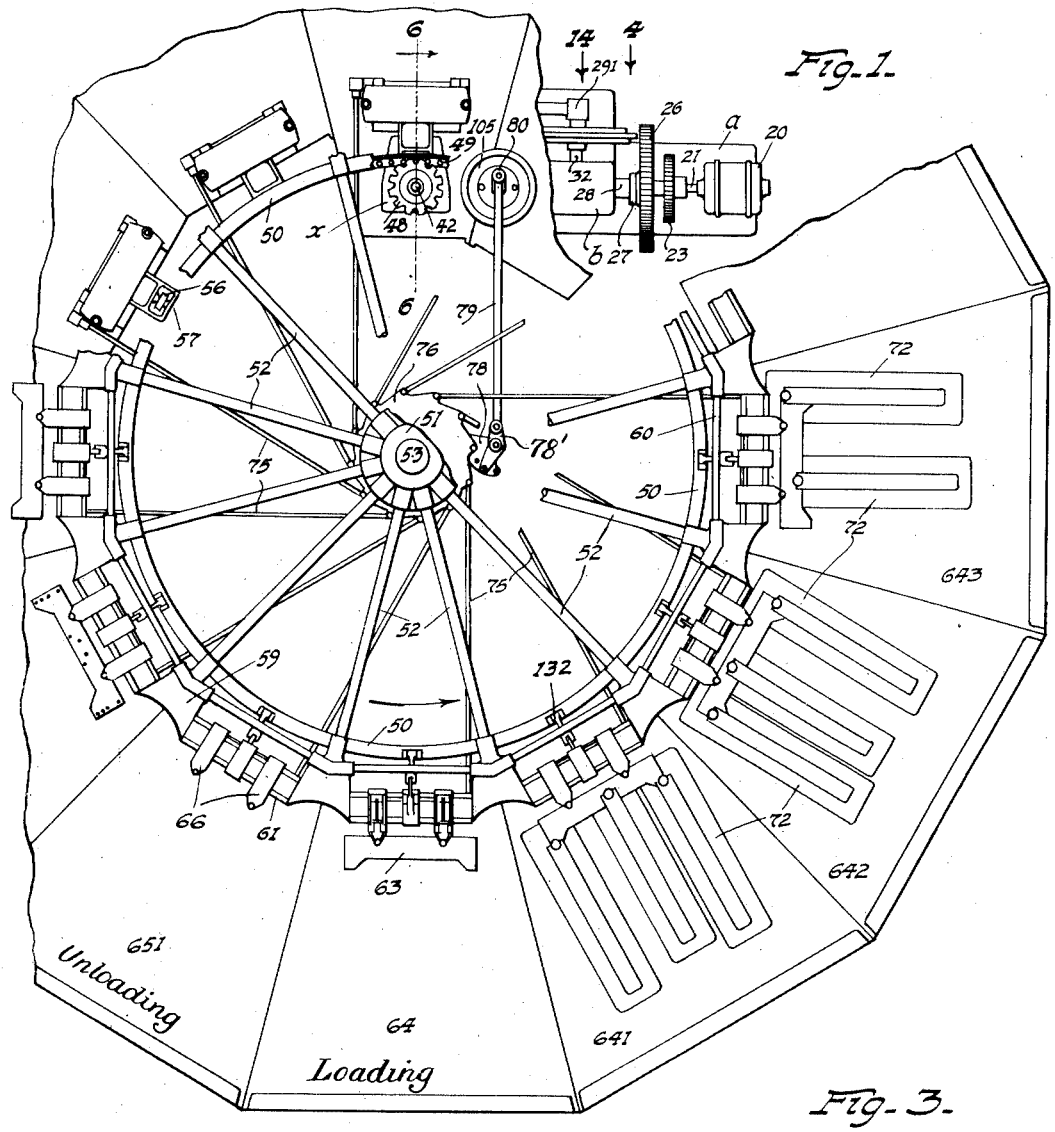

Fig. 6 is an enlarged vertical sectional view on the line 6—6, Fig. 1, looking in the direction of the arrows, and showing the arrangement of the gear and circular rack upon the turret, whereby the latter is intermittingly rotated, and also the pointed devices for doweling or accurately positioning in all directions one end of the clamping frames which support the blanks with relation to the machines or tools associated with the turret.

Fig. 7 is a vertical sectional fragmentary view, the reverse of that shown in Fig. 6, and showing the wedge devices positioning radially the other end of the blank clamping frames.

Fig. 8 is a like view of the holding catch and its tripper for the telescoping parts of a connecting link of the clamping devices.

Fig. 9 is a view mainly in elevation of the actuating devices at the loading station, and the means for actuating such devices to clamp the cross-bar blank.

Fig. 10 is a like view of the clamping jaws of the turret which hold the cross-bar blank in position for the operation thereon of the several machines and tools of the turret, this view being taken at the unloading station of the turret, and showing the devices which release the clamps from their engagement with the cross-bar blank.

Fig. 11 is an enlarged view in elevation showing the clamping jaws and the manner of their engagement with one of the blanks.

Fig. 12 is a vertical sectional view through the turret and showing in elevation one of the piercing presses as in position for operation upon a blank when presented thereto by the blank clamping mechanism of the turret.

Fig. 13 is a view in elevation of the devices which support and clamp a cross-bar, after the side margins of the blank have been drawn to form a channel, so that the further operations may be performed thereon, these devices being provided in another turret mechanism.

Fig. 14 is a view in side elevation, looking in the direction of the arrow 14, Fig. 1, of the timing cam for setting the dowels or positioning devices which accurately position the blanks in operative relation to the machines or tools assembled about the turret.

Fig. 15 is a diagrammatic view illustrating the cycle of operations of the turret.

In the drawings, the numeral 20 indicates a motor by which the revolving turret may be driven. The shaft 21 of the motor is journaled in suitable bearings at the base of machine, below the floor level, the said shaft carrying at its other end a pinion 22 which meshes with a gear 23 fixed upon a sleeved or tubular bearing shaft 24 which is journaled in a post 25 of the stationary frame $a$. Also fixed upon the tubular shaft 24, so as to rotate with the gear 23, is a fly-wheel 26, one face of the hub of which is provided with a clutch member adapted to be engaged by a cooperating clutch member formed upon one end of a clutch sleeve 27, splined upon a shaft 28 which latter is journaled at one end in the tubular bearing shaft 24. The clutch sleeve 27 is operated in the manner usual to such constructions, but its movements are always timed with the operation of the machines of the general assembly, so that when the engagement of the clutch members referred to is effected, the movement of the parts driven by the shaft 28 will be in positive synchronism with those of the general assembly. The other end of the shaft 28 is journaled in bearings formed in a housing $b$, on the frame $a$. The shaft 28, at a point intermediate the bearings in the housing, is provided with a worm 30. In mesh with the said worm and driven in the direction of the arrow thereon, is a worm wheel 31, keyed or otherwise fixed upon a cross shaft 32, likewise journaled in the housing $b$, and in a post 29 upon the base $a$. A timing mechanism. as will be hereinafter described, is mounted upon the cross shaft 32.

The other end of the shaft 28 has fixed thereon a beveled pinion 33, which meshes with and drives a beveled gear 34, supported so as to rotate loosely upon a stepped or shouldered sleeve 35, fixed to a vertically arranged shaft 36, the latter being journaled in the frame, and rotating in a casing $c$, fixed upon the frame $a$. The shaft 36 carries a pinion 37 near its lower end, which is in mesh with gear 38 fixed on a short shaft 39 journaled in the frame, and carrying an eccentric gear 40, which meshes with a like gear 41 fixed upon the vertically disposed turret driving shaft 42, the latter also being journaled and supported in the frame of the apparatus, and at its upper end in a bearing $x$, Fig. 6. The purpose of the eccentric gears is to impart a slow starting movement to the turret shaft 42, and a corresponding decrease in the speed as the end of the movement is approached. A drum 43, carried by the turret driving shaft 42 is encircled by a friction band 44, fixed at one end, the pressure of which upon the drum may be regulated by an expansion spring 45, confined between a fixed part and a regulating nut 46 upon the end of a threaded rod 47, the other end of which rod is attached to the band 44, so as to exert tension thereon. The purpose of the friction device described is to arrest any tendency due to the momentum of the parts to over-run when the controlling clutch on the shaft 36 is shifted into disengaging position.

The turret driving shaft 42 carries at its upper end a spur wheel 48, the teeth of which wheel are in mesh with spaced pins 49, set in the circumferential ring 50 of the turret wheel. The said turret wheel is composed of a central spider 51, from which radiate spokes 52, connected near their outer ends to the said ring 50, the spider 51 being centrally supported so as to be free to revolve about a shouldered post 53, rising from a base 54. The ring 50 may be formed as a rolled beam of special cross sectional shape resembling somewhat a T-bar, having at the inside of the ring a strip which parallels the top flange of the bar at the same side. The spaced pins 49 are set vertically in the parallel members described, and thus is formed a lantern or turret indexing gear which is engaged by the gear 48, to impart to the turret its movements in a circular path. The circular lower flange 55 of the ring 50 rests upon a number of anti-friction rollers 56, suitably journaled in brackets 57 on stands $d$, forming parts of the frame of the apparatus, the said rollers being spaced such distance apart as will efficiently support the turret ring 50 and the weight carried thereby, which weight is equally distributed over the several anti-friction rollers 56. The stands $d$ are equal in number to the number of operating stations located around the turret.

Figures 2, 3:
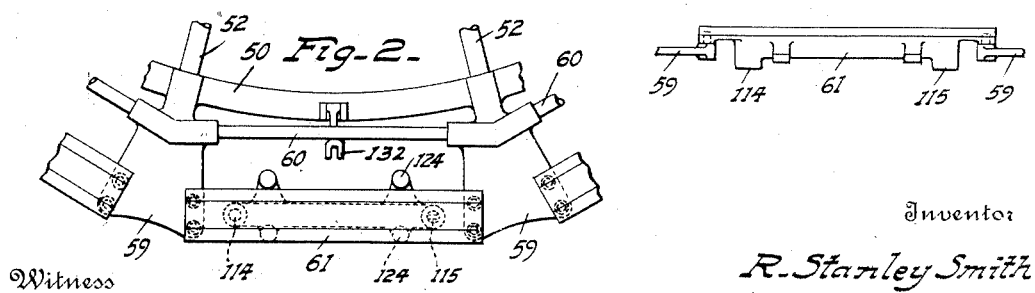
Fig. 2 is an enlarged plan showing in detail the construction of a section of the outer rim of the turret.
Fig. 3 is a view in elevation, looking toward the turret, and showing one of the bridge pieces for supporting the clamping frames at the outer rim of the turret.

Each of the radial spokes 52 of the turret is provided at its outer end with a bracket 59, the brackets at the ends of adjacent spokes being connected by means of tie rod 60, so as to form a rigid structure. Each of the brackets 59 is provided on its upper face with a plane surface, and a bridge piece 61, for supporting the cross-bar blank clamping frame 62, rests upon the brackets and extends across the space between the brackets of adjacent spokes, and is secured thereto at its ends, as shown in Fig. 2, to further unify the structure of the turret.

Upon each bridge piece 61, a longitudinally movable frame 62 is adjustably mounted by means of a dove-tail connection and held in adjusted position by means of wedge blocks 61', the said frame being provided with clamping devices which serve to retain the cross-bar blank 63, when the latter is received at station 64 from the line conveyor, and to hold the said blank in position for operation thereon by the special machines and tools grouped about the turret, when presented thereto, all in a manner which will now be described.

For the purpose of firmly holding the cross-bar blanks during their movement in the rotation of the turret, and accurately presenting the blanks, each frame 62 is provided with a plurality of clamping devices. In the present instance, two of such devices have been found to be sufficient, and they are not necessarily secured in unchangeable position upon the frame 62 which supports them, but may have provision for adjustment with relation to each other, if such adjustment be found desirable. The clamping devices are constituted of a fixed jaw 65 attached to the frame 62, and a complemental jaw 66, pivoted intermediate its ends upon the jaw 65, as at 67. A lever 68 is pivoted at one end as at 69 upon the jaw 66, the lever 68 and the jaw 66 lying parallel for a portion of their rearward extension, and being normally held in contact by means of an expansion spring 70, confined by a bolt 71, which passes through the rear end of the jaw 66 and the lever 68. The faces of the jaws may be suitably formed for insuring a holding grip upon the blank, by a concave formation 65' in one jaw and a convex formation 66' in the other, as indicated in Fig. 11, or in such other manner as may be found effective for the purpose. A toggle mechanism, actuated in the manner hereinafter described, operates the jaws 65 and 66 at the required times to seize and clamp the blank 63 when the latter is transferred from the line conveyor, and to release it for re-transfer to the said conveyor upon the completion of the operations by the mechanisms assembled around the turret.

The general arrangement of the special tools and machines about the turret is conventionally shown in Fig. 1, and one of such machines, in the present instance, a perforating press 72, is shown in elevation in Fig. 12, in which the plane of the travel of the cross-bar blank 63 and its position with relation to the perforating press 72 is indicated. The special machines and tools are grouped in a circle about the turret, and together with their operating elements are arranged so that the necessary operations may be performed at the precise points desired, in the movement of the blank through its circular path in a horizontal plane. Such special machines and tools, of which the perforating press 72 is a type, will be of such character and in such numbers as to meet the requirements of each particular blank or element, and the number and arrangement of such machines positioned at the separate stations about the turret will be determined by the limitations of space as affected by the proximity of the perforations in the blank to each other, or other operations to be performed on the blanks, as they are successively carried through their circular path of movement. In Fig. 1 three of such machines are shown at stations 641 and 642, while at station 643, but two of such machines are shown, each producing differently located perforations. In each instance, the arrangement of the machines at any of such succeeding stations is for the performance of operations which cannot conveniently be performed at the preceding station or stations, by reason of the interference described. The showing in Fig. 1 is merely diagrammatic, but it will be understood from what has been stated above, that the number and arrangement of the machines at the several stations about the turret, will be dependent upon the extent of the work to be performed in connection with each of the blanks. The blanks carried by the turret are subject to like operations at the same station, and to different operations at the succeeding stations, it being desirable to perform all of such operations in the portion of the time cycle allotted for the operation of the said special machines and tools, and in the intervals of the conveyor movement from station to station by the turret. But while it is preferable to perform all of the operations simultaneously, it is not necessary that exact synchronism be observed, inasmuch as a peak load upon the source of power may be avoided by apportioning to each special machine or tool a fraction of that part of the time cycle in which all of the operations are scheduled to take place, and operating the machines and tools successively but all within the time allotted. All of the operations, however, will be effected in the intervals between conveyor movements of the turret.

As before stated, the stands $d$ are equal in number to the number of stations located about the turret. Journaled in bearings in each of the said stands $d$ is a shaft 73, which is adapted to have a rocking movement imparted thereto by means of a radial arm 74, to the free end of which is adjustably connected one end of a link 75, the other end of which is pivoted to a disk 76, arranged circumferentially on a sleeve 77, mounted for free oscillation on the post 53 upon which the turret rotates, and confined between a shoulder on the base of the post and a set collar 54', there being one such link 75 for each of the shafts 73 connected to the disk 76. Also, fixed upon the sleeve 77 so as to oscillate the same, is a radial arm 78, the free end of which supports a centrally pivoted adjusting lever 78' which is connected by means of a link 79 to a crank pin 80, carried by an intermittingly rotating spindle 81, aligned with the vertical shaft 36 in the casing $c$, before referred to. The adjusting lever 78' pivoted intermediate its ends upon the radial arm 78, can be moved about its vertical pivot to change the radius of the connecting point at one end of the lever 78' with the link 79, so as to vary the arc through which the sleeve 77 is made to oscillate. Fixed position of the lever 78' upon the arm 78 is effected by means of a pin passed into a hole in the other end of the lever 78' and into the selected one of several holes in the arm 78.

The gear 34, as before stated, is mounted upon the said shaft 36, so as to be normally free from rotative engagement therewith, and while the said gear 34 moves continuously during the operation of the machine, that is, during the time that the clutch 27 is effective, the rotation of shaft 36 is made dependent upon the action of certain other clutch mechanisms, which in their operation are controlled by a timing mechanism, as will later be described.

The hub of the pinion 37, fixed upon the shaft 36, is of a length to fill the space between adjacent parts of the frame, so that the said shaft 36 is restrained from any vertical movement. The gear 34 is formed as a ring, on each side of which are secured hub members 82 and 83, the latter being supported upon the shouldered sleeve 35, before described. A similar sleeve 84, reversely arranged, is placed over the shaft 36 and into the bore of the hub member 82, the two flanged collars 35 and 84 on the said sleeves being positioned and fixed upon the shaft 36, to form a journal for the gear 34 and its united hub members. The outer faces of the hub members 82 and 83 of the said gear 34 are formed with clutch faces, adapted to be intermittingly engaged by the co-acting faces of the clutch members 85 and 86, the one splined on the shaft 81 and the other splined on the shaft 36, and adapted to be alternately actuated so as to engage the clutch faces of the gear 34.

Rock shafts 87 and 88 are journaled in the casing $c$ and carry radial arms 89 and 90. Each of the splined clutch members 85 and 86 is provided with a circumferential groove in which rests a non-rotating collar 85', 86', having a pivotal connection with the radial arms 89 and 90 respectively.

The worm driven shaft 32, outside of the casing $d$ carries a timing cam 91, indicated in Fig. 14, which timing cam through suitable connections imparts rocking movements to the shafts 87 and 88 to engage and disengage the clutch members 85 and 86 with the clutch faces of the gear 34. The timing cam 91 is shown as having cam grooves 92 and 93 upon its opposite faces. Into the groove 92 is entered a cam follower upon the free end of a radial arm 93' fixed upon the rock shaft 87, while the groove 93 is entered by a cam follower upon the free end of a radial arm 94 fixed upon a stud 95, and having a second radial arm 96, the free end of which is connected by a link 97 to a second radial arm 98 fixed upon the rock shaft 88.

A bearing 99 for the vertically arranged shaft 81 is formed in the top of the casing $c$, and set rings 100 and 101 are fixed upon the shaft 81 above and below the bearing 99, to restrain the said shaft from longitudinal movement. The lower end of the shaft 81 is of tubular formation, and receives therein the upper end of the shaft 36, an upwardly extended portion of the shouldered sleeve 84 serving as a bushing between the upper end of the shaft 36 and the tubular shaft 81. When the clutch faces of the members 83 and 86 are in engagement, rotation is imparted to the shaft 36 by the gear 34; likewise, when the clutch faces of the members 82 and 85 are in engagement, the shaft 81 is rotated; but these operations may overlap without any interference at certain points in the cycle of movement of the parts, as will be made clear later in connection with the explanation of the timing diagram of the cycle of operations shown in Fig. 15.

A spider 102 is set in fixed position in an opening in the frame near the upper end of the shaft 81, and the hub of such spider forms a journal bearing for the said upper end of the shaft. A ring plate 103, arranged concentrically upon the said spider, has a slight axial movement with relation to the spider, but rotation of the ring plate is prevented by pins 104 set in the spider and entering openings in the ring plate. A disk 105 in which the crank pin 80, before referred to, is eccentrically set, is fixed upon the upper end of the shaft 81, so as to have frictional engagement at times with the upper surface of the ring plate 103. The ring plate 103 is provided with a circular recess or well in which is placed an expansion spring 106, arranged about the shaft 81, and exerting a pressure tending to separate the ring plate 103 and the crank disk 105. A friction disk 107 is arranged between the ring plate 103 and the disk 105, rotation of the friction disk being prevented by means of pins affixed to the friction disk, and which enter perforations in the ring plate. The expansion of the spring 106 holds the friction disk 107 at all times in engagement with the under side of the crank disk 105, and other friction surfaces are placed upon the meeting faces of the said ring and disk near the extremes of their diameters, so as to retard the rotation of the crank disk.

The cam 92 which actuates the rock shaft 87, will engage the clutch members 82 and 85 for a length of time sufficient to enable the shaft 81 to impart a half revolution to the crank 80, and through the connections previously described, a movement of partial rotation is thereby imparted to the disk 76, oscillating upon the post 53 of the turret. The friction devices previously described as designed to retard the movement of the crank disk 105 upon the ring plate 103, are supplemented by devices which serve to effectually lock the said crank disk to the ring plate, so as to prevent any movement of the crank disk, except when positively driven by the shaft 81. The collar 85' which is received in the groove of the clutch member 85, is provided with oppositely projecting ears to which are pivoted the lower ends of adjustable doweling rods 108. These doweling rods move in tubular guides 109, which depend from the ring plate 103. The crank disk 105 is provided with openings 110 which are entered by the pointed upper ends of the rods 108, when the clutch member 85 is raised out of its position of engagement with the clutch face 82 of the gear 34. Expansion springs 111 are coiled about the rods 108, and are confined between collars 112 on the said rods and adjusting nuts 113 threaded into the interior of the lower ends of the tubular guides 109, the purpose of the said springs being to supplement the action of the cam 92 in the withdrawal of the upper ends of the rods 108 from their doweling engagement with the crank disk 105, when the clutch members 82 and 85 are again engaged, to effect another partial rotation of the crank disk 105.

Each bridge 61 is provided with depending bosses 114 and 115, by means of which the frames 62 carrying the cross bar blanks are doweled or accurately positioned at the several stations about the turret, so as to be in proper relation for operation upon the blanks by the machines and tools which are placed at the several stations. The boss 114 is provided with a bore adapted to be entered by the pointed upper end of a doweling rod 116, which is guided for vertical movement in brackets on the stand $d$, the said rod having a movement into and out of engagement with the opening in the boss 114, the disengagement being to permit the intermitting circular movement of the turret. The upper end of the doweling rod 116 is guided in a tubular bushing 117 mounted in the bracket of the stand $d$, and its downward movement is limited by a shoulder formed upon the said rod which engages a like construction at the lower end of the interior of the bushing 117. The lower end of the rod 116 is passed through a bore in the tubular member 119, which latter is also guided in a bracket on the stand $d$, the said lower end of the rod 116 being threaded for adjustment with relation to the tubular member 119. An expansion spring 120 is confined in the said bore between a washer 118 on the lower end of the rod 116 and resting at the bottom of the bore, and the lower end of the bushing 117. The polygonal end 121 of the rod 116 enables an exact vertical adjustment of the pointed end of the rod to be made by the rotation thereof. A radial arm 122 fixed to the rock shaft 73 is pivoted at its free end to the said tubular member 119, so that the rods are actuated in the rocking movement of the shaft 73, through the link 75, which as before stated, is pivoted to the reciprocating disk 76 which oscillates upon the post 53 of the turret.

Vertically arranged overhanging brackets 123 are attached to the stand $d$ and bear upon fingers 124 projecting laterally from the bridge 61, so as to restrain the said bridge from rising from the horizontal plane in the rotating movements of the turret. When the rod 116 is moved upwardly to engage the opening in the boss 114 of the bridge 61, the bushing 117 is released by the separation of the engaging shoulders on the two parts, and the said bushing is therefore moved upwardly by the expansion of the spring 120. The upper end of the said bushing will be brought into engagement with the lower side of the boss 114 to prevent vibration of the bridge 61 below the plane of its movement. When the rod 116 is withdrawn from its engagement with the boss 114, the shoulder formed at the reduced part of the rod engages the shoulder of the bushing 117, and withdraws the upper end of the latter from its frictional engagement with the bridge 61. It will be understood that the doweling action of the rods 116 occurs at the conclusion of the step by step movements of the turret, and that such rods are withdrawn from their doweling engagement just prior to the next movement of the turret.

While the pointed rod 116 serves to position one end of the bridge 61 in all directions by reason of the manner of its engagement with the boss 114, the boss 115 is designed merely to position the bridge radially of the turret, and this result is secured by providing the said boss 115 with a plug 124 having a slot extending in the direction of the length of the bridge. The said slot is adapted to be entered by a doweling wedge 125, likewise mounted for vertical movement in brackets on the stand $d$, and similarly and synchronously actuated by means of a radial arm 126, also mounted on the rock shaft 73.

In Fig. 10 I have illustrated the devices mounted on the frame 62 which clamp the cross-bar blank and hold the same in position during one revolution of the turret, so that the said blank may be properly presented in succession to the machines at the several stations. Fig. 10 shows in addition the arrangement of the devices at the unloading station 651, together with the devices located at that station which operate to release the blank at the conclusion of its movement in a circular path, so that the blank may be transferred to the main line conveyor, or to another turret, for further treatment. Fig. 9 shows in addition the devices at the loading station 64, whereby the clamping jaws are actuated to seize and hold the cross-bar blank. The arrangement of the clamping jaws has been previously described. A rock shaft 127 is mounted upon each frame 62, and is connected to the free end of the lever 68, before referred to, by means of a toggle 128. The rock shaft 127 is provided with a radial arm 129, to the free end of which is connected a depending link 130, pivoted centrally at 131 to a link 132, the other end of which is pivoted at 133 upon the ring 50 of the turret. The projecting lower end of the link 130 is provided with a face which forms a striking head 135, which is adapted to be engaged by a pin 136 adjustably set in the upper end of a rod 137, which latter is guided for vertical movements in brackets on the stand $d$ at the loading or receiving station 64.

A rock shaft 138, in all particulars as to its mounting and actuating, the same as the rock shafts 73, is journaled in the stand $d$ at the receiving station. A radial arm 139 is connected to its free end to a telescoping link 140, the other end of which is connected by a bell crank 141 pivoted on the bracket 57. The other arm of the bell crank is connected by means of a link 142 to a collar 143 set on the rod 137. The rocking movement of the shaft 138 and the movement of the radial arm 139 to the left, will actuate the toggle through the connections described to operate the clamping jaws to grip the side bar blank. Such movement will set the toggle, and it will remain undisturbed until in the revolution of the turret the cross-bar blank is brought to the unloading or delivering station 651.

One member of the telescoping link 140 slides within the other. Upon the outer member is mounted a tripping catch 144, which is normally held in position to engage a collar 145 on the inner member of the link, by means of an expansion spring 146 confined about a post bearing upon the catch 144, as shown in Figs. 8 and 9. An upstanding arm 147 of the catch is adapted to engage a stop on the stand $d$ so as to arrest the further movement of the catch and disengage it from the collar 145, so as to permit further movement of the inner member of the link. This movement is provided in recognition of the different degrees of movement imparted to the operating elements. An expansion spring 148 confined about the rod 137 will withdraw the latter from its engagement with the lower end of the lever 130 at the instant that the toggle 128 is properly set.

The depending end of the lever 130 is also provided with a catch 149 which is adapted to be engaged by devices shown in Fig. 10 to break the toggle when the cross-bar blank has completed its circular movement and is presented at the delivering station 651. A shaft 150, like the shaft 73, is journaled on the stand $d$ at the delivery station 651, the said shaft being provided with radial arm 151, the free end of which is connected by a link 152, connected at its other end to links 153, 153, constituting a toggle, one of the links 153 being pivoted to the bracket 57 and the other to a collar 154 set on a rod 155, which is adapted to move vertically in the bracket 57 and guided at its lower end in a bracket 158. The rod 155 has secured at its upper end a tripping device 159, which is adapted to engage the catch 149 on the depending end of lever 130, so at the proper moment in the actuation of the rock shaft 150, the toggle 128 is broken, and the clamping jaws are caused to release their hold upon the cross-bar blank.

Fig. 13 shows an arrangement of devices which are adapted to clamp a cross-bar blank after it has been formed into a channel as a cross-bar, and presented to another turret for the performance thereon of subsequent operations. The rock shaft 127 mounted on the frame 621, the radial arm 129 and the link 130, operate as before. A second radial arm 160 mounted on the shaft 129 actuates a link 161 connected to one arm 162 of a rock shaft 163, on which is mounted a second radial arm 164, and this in turn is connected to a link 165, which actuates a clamping member 166 pivoted upon a rock shaft 167. The clamping member 166 carries at its other end a clamping dog 168, which may be of the triangular form shown in Fig. 13, and adapted to be seated in the channel of the cross-bar to engage two of the points thereof with the web and near the flange of the cross-bar with an angular pressure in the manner shown, and securely hold the latter in its seat upon the table 621. The links 164 and 165 constitute a toggle, which when set will serve to hold the cross-bar which is taken on at the receiving station and by means of the engagement of the dog 168 therewith, clamp it in immovable position until the cross-bar turret has completed its circular movement and reached the delivery station.

The general assembly disclosed in my prior Patent No. 1,397,020, granted November 15, 1921, above referred to, is constructed to operate in cycles each of ten seconds duration. The present mechanism is designed to operate preferably in accordance therewith, and for the purpose of making clear the operation of the present mechanism, I have shown in Fig. 15 a diagram visualizing the fractional parts of the cycle of operation apportioned for the various movements. The diagram has been subdivided for convenient illustration into ten segments, each of which represents a duration of one second in point of time. The line indicated by the numeral (1) represents a period of five seconds, which time is allotted for the performance of their respective operations by the several special machines and tools grouped about the turret. The line indicated by the numeral (2), and coinciding with the line 1, represents a like period of five seconds, during which time the special machines and tools are at rest, and the shifting or conveyor operations by the turret take place during this last mentioned one-half of the cycle, or in allotted fractions thereof. The direction of rotation of the timing cam is indicated by the arrow in the diagram. The turret remains stationary for six seconds, as indicated by the numeral (3) in the diagram, and the intermitting rotary movement of the turret occurs in the remaining four seconds of the cycle, as indicated by the numeral (4). The dowels 108 remain in engagement with the crank disk 105, holding the latter in fixed position for a period of five seconds, as indicated by line 5, during which time the machines and tools are performing their operations, and such dowels are withdrawn for a period of four seconds, as indicated by line 6, to permit the partial rotation of the crank disk 105, a period of one-half second, line 7, being allowed for the dowel setting, and a like period, line 8, being allowed for their retraction.

Having thus described my invention, what I claim and desire to secure by Letters Patent of the United States, is:

1. In a mechanism for operating upon metal elements, a receiving station, a discharging station, a revolving turret provided with devices operating in planes transverse to that of the rotation of the turret and adapted to hold a succession of blanks, automatic means for operating the said devices in succession to receive and clamp the blanks at the receiving station and hold them during the rotation of the turret, and automatic means for operating the said devices to release the blanks at the discharging station in like succession upon completion of such rotation, in combination with means for rotating the turret, and a plurality of machines grouped about the turret and adapted to perform different operations successively upon the blanks as presented thereto by the turret.

2. In a mechanism of the class described, a vertical support, a turret rotating in a horizontal plane thereon and provided with a plurality of work holders, operating in planes transverse to that of the rotation of the turret, a plurality of machines arranged about the turret and in the rotating plane thereof for operating successively upon the work as presented by the turret, means for rotating the turret to present the work successively to the said machines, and devices axially located with relation to the turret to operate the work holders to clamp and release the work in the rotation of the turret.

3. In a mechanism of the class described, a turret and a vertical support upon which it is rotated in a horizontal plane, a plurality of work holders mounted upon the turret and operating in planes transverse to that of the rotation of the turret, a plurality of machines arranged about the turret to perform different operations successively upon the work as presented by the turret, means axially located with relation to the turret, and radially extending connections between the said means and work holders for operating the latter to clamp and release the work.

4. In a mechanism of the class described, a turret and a support upon which it is rotated in a horizontal plane, a plurality of work holders mounted upon and movable with the turret and operating in planes transverse to that of the rotation of the turret, a plurality of machines arranged about the turret to perform different operations successively upon the work as presented by the turret, stationary devices for operating the said work holders to clamp and release the work, and means axially located with relation to the turret for actuating the said stationary devices.

5. In a mechanism of the class described, a turret and means for rotating it, work holders upon the turret comprising a table for supporting a channel bar, and a device engaging the web of the channel bar and one flange at the inside thereof to clamp the bar upon the table with an angular pressure.

6. In a mechanism of the class described, means for supporting a channel bar in position for a machining operation thereon, in combination with a device for engaging the web and one flange of the channel bar at the inside thereof to clamp the bar upon its supporting means with an angular pressure.

7. In a mechanism of the class described, a work holder comprising a table for supporting a channel bar and devices for engaging the web of the channel bar and a flange at the inside thereof to clamp the bar upon the table with an angular pressure.

8. In a mechanism of the class described, means for supporting a channel bar in position for a machining operation thereon, in combination with a pivoted lever carrying a clamping dog adapted to enter the channel and engage the web and one side of the bar to clamp the latter upon its supporting means.

In testimony whereof I have signed my name at Milwaukee, this 12th day of November, 1921.

R. STANLEY SMITH.